(12) United States Patent
Wege et al.

(10) Patent No.: US 6,509,510 B1
(45) Date of Patent: Jan. 21, 2003

(54) METHOD FOR HYDROGENATING AROMATIC POLYMERS IN THE PRESENCE OF SPECIAL CATALYSTS

(75) Inventors: Volker Wege, Krefeld (DE); Johann Rechner, Kempen (DE); Eberhard Zirngiebl, Köln (DE)

(73) Assignees: Bayer Aktiengesellschaft, Leverkusen (DE); Teijin Ltd., Osaka (JP)

( * ) Notice: Subject to any disclaimer, the term of this patent is extended or adjusted under 35 U.S.C. 154(b) by 0 days.

(21) Appl. No.: 09/743,870

(22) PCT Filed: Jul. 20, 1999

(86) PCT No.: PCT/EP99/05148

§ 371 (c)(1),
(2), (4) Date: Jan. 16, 2001

(87) PCT Pub. No.: WO00/05279

PCT Pub. Date: Feb. 3, 2000

(30) Foreign Application Priority Data

Jul. 23, 1998 (DE) .......................................... 198 33 094

(51) Int. Cl.⁷ .................................................. C07C 5/10
(52) U.S. Cl. ........................ 585/266; 585/269; 585/270
(58) Field of Search ................................ 585/266, 269, 585/270

(56) References Cited

U.S. PATENT DOCUMENTS

| | | | |
|---|---|---|---|
| 4,997,898 A | | 3/1991 | Ishihara et al. ............. 526/308 |
| 5,028,665 A | * | 7/1991 | Hucul ........................ 525/339 |
| 5,352,744 A | | 10/1994 | Bates et al. ................. 525/339 |
| 5,612,422 A | * | 3/1997 | Hucul et al. ................. 525/338 |
| 6,248,924 B1 | * | 6/2001 | Ruhl et al. .................. 564/450 |
| 6,376,622 B1 | * | 4/2002 | Hucul ........................ 525/338 |

FOREIGN PATENT DOCUMENTS

| | | |
|---|---|---|
| EP | 378 104 | 7/1990 |
| EP | 814 098 | 12/1997 |
| GB | 933127 | 8/1963 |
| GB | 1513852 | 6/1978 |
| WO | 96/34896 | 11/1996 |

OTHER PUBLICATIONS

Applied Heterogenous Catalysis, Institute Francais du Petrole Publications, (month unavailable), 1987, pp. 187–237, Study of the physico–chemical characteristics of the catalytic solid.
*Chemical Abstracts, vol. 119, No. 10, Sep. 6, 1993, Abstract No. 96524y, XP000400853 & JP 05 039315 A (Shinnittetsu Kagaku) Feb. 19, 1993.

* cited by examiner

Primary Examiner—Walter D. Griffin
Assistant Examiner—Tam M. Nguyen
(74) Attorney, Agent, or Firm—Joseph C. Gil; Aron Preis

(57) ABSTRACT

Process for hydrogenating aromatic polymers in the presence of catalysts, wherein a metal or mixture of metals from group VIII of the Periodic Table together with a support of silicon dioxide, aluminium dioxide or a mixture thereof is used as the catalyst, and the catalyst pore volume defined by pores of diameters between 100 and 1000 Å, measured by mercury porosimetry, is generally from 100 to 15%, in relation to the total pore volume, measured by mercury porosimetry.

10 Claims, No Drawings

METHOD FOR HYDROGENATING AROMATIC POLYMERS IN THE PRESENCE OF SPECIAL CATALYSTS

The invention provides a process for hydrogenating aromatic polymers, which is characterised in that Group VIII metals are present together with a support of silicon dioxide or aluminium oxide or mixtures thereof. The catalysts have a specific pore size distribution. This enables the aromatic units of aromatic polymers to be hydrogenated completely, without a significant decrease in molecular weight.

Hydrogenation of aromatic polymers is already known. DE-AS 1 131 885 describes the hydrogenation of polystyrene in the presence of catalysts and solvent. Aliphatic and cycloaliphatic hydrocarbons, ethers, alcohols and aromatic hydrocarbons are mentioned as the solvents. A mixture of cyclohexane and tetrahydrofuran is named as preferable. Silicon dioxide and aluminium oxide catalyst supports are mentioned in a general manner, their physico-chemical structure not, however, being described.

EP-A-322 731 describes the preparation of predominantly syndiotactic polymers based on vinyl cyclohexane, wherein a styrene-based polymer is hydrogenated in the presence of hydrogenation catalysts and solvents. Cycloaliphatic and aromatic hydrocarbons, but not ethers, are mentioned as the solvents.

DE 196 24835 (=EP-A 814 098) for the hydrogenation of polymers with ruthenium or palladium catalysts, in which the active metal is applied to a porous support, describes the hydrogenation of olefinic double bonds of polymers. The hydrogenation level of aromatic regions is less than 25% and is generally within the range 0 to approximately 7%. The choice of solvents is not critical here.

It is furthermore known (WO 96/34896=U.S. Pat. No. 5,612,422) that in the hydrogenation of aromatic polymers small pore diameters (200–500 Å) and large surface areas (100–500 $m^2/g$) of silicon dioxide-supported catalysts result in incomplete hydrogenation and in degradation of the polymer chain. The use of specific silicon dioxide-supported hydrogenation catalysts (WO 96/34896) permits virtually complete hydrogenation with an approximately 20% decrease in molecular weight. The silicon dioxide of the named catalysts has a specific pore size distribution which is characterised in that 98% of the pore volume is defined by pores of a diameter greater than 600 Å. The named catalysts have surface areas of between 14 and 17 $m^2/g$ and average pore diameters of from 3800 to 3900 Å. The hydrogenation levels achieved on dilute polystyrene solutions in cyclohexane at a concentration of between 1% and 8% maximum are greater than 98% and less than 100%.

The examples described in the named specifications show a decrease in the absolute molecular weight of the hydrogenated polystyrene when polymer concentrations are less than 2%. Decreased molecular weight generally leads to a deterioration in the mechanical properties of a hydrogenated polystyrene.

The Comparative Example according to WO 96/34896 of a commercially available catalyst 5% $Rh/Al_2O_3$ (Engelhard Corp., Beachwood, Ohio, USA) yields a 7% hydrogenation level and shows that the activity of the aluminium oxide support is lower than that of the silicon dioxide-supported catalyst.

It has surprisingly now been found that aromatic polymers are hydrogenated completely and with no significant decrease in molecular weight when specific catalysts are used which comprise Group VIII metals together with a support of silicon dioxide, aluminium oxide or a mixture thereof, which are defined in that at least 10%, preferably 15%, of the pore volume is defined by pores of a diameter less than 600 Å, and they have an average pore diameter of 900 Å maximum, a BET surface area of at least 40 $m^2/g$ and a defined pore size distribution.

The invention provides a process for hydrogenating aromatic polymers in the presence of catalysts, wherein the catalyst is a metal or a mixture of metals from Group VIII of the Periodic Table together with a support of silicon dioxide, aluminium oxide or a mixture thereof, and the catalyst pore volume defined by pores of diameters between 100 and 1000 Å, measured by mercury porosimetry, is generally from 100 to 15%, preferably from 90 to 20% and most particularly preferably 80 to 25%, in particular 70 to 25%, in relation to the total pore volume, measured by mercury porosimetry.

The average pore diameter, determined by mercury porosimetry, is 900 Å maximum.

The mercury method is, however, sufficiently accurate only for pores larger than 60 Å. Pore diameters of less than 600 Å are therefore determined by nitrogen sorption according to Barret, Joyner, Halenda (DIN 66 134).

The catalysts therefore additionally have a 100 to 10%, preferably 80 to 10%, in particular 70 to 15% pore volume, measured by nitrogen sorption, which is defined by pores of diameters of less than 600 Å. The pore volume, measured by nitrogen sorption, relates to the total pore volume, measured by mercury porosimetry.

The average pore diameter and the pore size distribution are determined by mercury porosimetry in accordance with DIN 66 133.

The average pore diameter is generally from 10 to 1000 Å, preferably 50 to 950 Å, most particularly preferably 60 to 900 Å.

Methods for characterising hydrogenation catalysts are described, for example, in WO 96/34896 (=U.S. Pat. No. 5,612,422) and Applied Heterogeneous Catalysis, Institut Francais du Pétrole Publication, pp. 189–237 (1987).

The catalysts consist of Group VIII metals which are present together with a support of silicon dioxide or aluminium oxide or mixtures thereof.

The surface area of the catalyst is determined in accordance with BET (Brunauer, Emmett and Teller) processes by nitrogen adsorption, in accordance with DIN 66 131 and DIN 66 132.

The specific nitrogen surface areas (BET) are generally from 40 to 800 $m^2/g$, preferably 50 to 600 $m^2/g$.

Group VIII metals, preferably nickel, platinum, ruthenium, rhodium, palladium, in particular platinum, palladium and nickel, are generally used.

The metal content, in relation to the total weight of the catalyst, is generally from 0.01 to 80%, preferably 0.05 to 70%.

The 50% value of the cumulative distribution of particle size is generally from 0.1 $\mu$m to 200 $\mu$m, preferably 1 $\mu$m to 100 $\mu$m, most particularly preferably 3 $\mu$m to 80 $\mu$m, in the batch process.

Conventional solvents for hydrogenation reactions are aliphatic or cycloaliphatic hydrocarbons, aliphatic or cycloaliphatic saturated ethers or mixtures thereof, for example, cyclohexane, methylcyclopentane, methylcyclohexane, ethylcyclohexane, cyclooctanes, cycloheptane, dodecane, dioxane, diethylene glycol dimethyl ether, tetrahydrofuran, isopentane, decahydronaphthalene.

If aliphatic or cycloaliphatic hydrocarbons are used as solvents, they preferably contain water in a quantity of generally from 0.1 ppm to 500 ppm, preferably 0.5 ppm to 200 ppm, most particularly preferably 1 ppm to 150 ppm, in relation to the total solvent.

The process according to the invention generally leads to practically complete hydrogenation of the aromatic units. The hydrogenation level is generally ≧80%, preferably ≧90%, most particularly preferably ≧99% to 100%. The hydrogenation level can be determined by NMR or UV spectroscopy, for example. The process according to the invention results most particularly preferably in hydrogenated aromatic polymers, in particular polyvinyl cyclohexane, wherein the quantity of diads having syndiotactic configuration is greater than 50.1% and less than 74%, in particular from 52 to 70%.

Aromatic polymers which are selected, for example, from among polystyrene optionally substituted in the phenyl ring or on the vinyl group, or copolymers thereof with monomers selected from the group comprising olefins, (meth)acrylates or mixtures thereof, are used as starting materials. Further suitable polymers are aromatic polyethers, in particular polyphenylene oxide, aromatic polycarbonates, aromatic polyesters, aromatic polyamides, polyphenylenes, polyxylylenes, polyphenylene vinylenes, polyphenylene ethylenes, polyphenylene sulfides, polyaryl ether ketones, aromatic polysulfones, aromatic polyether sulfones, aromatic polyimides and mixtures thereof, copolymers, optionally copolymers with aliphatic compounds.

$C_1$–$C_4$-alkyl, such as methyl, ethyl, $C_1$–$C_4$-alkoxy, such as methoxy, ethoxy, condensed aromatics bonded with the phenyl ring by way of either one or two carbon atoms are considered with phenyl, biphenyl, naphthyl, as substituents in the phenyl ring.

$C_1$–$C_4$-alkyl, such as methyl, ethyl, n-propyl or iso-propyl, in particular methyl in the α-position, are considered as substituents on the vinyl group.

Olefinic comonomers which are considered are ethylene, propylene, isoprene, isobutylene, butadiene, cyclohexadiene, cyclohexene, cyclopentadiene, optionally substituted norbornenes, optionally substituted dicyclopentadienes, optionally substituted tetracyclododecenes, optionally substituted dihydrocyclopentadienes, $C_1$–$C_8$-, preferably $C_1$–$C_4$-alkylesters of (meth)acrylic acid, preferably methyl and ethylesters, $C_1$–$C_8$-, preferably $C_1$–$C_4$-alkylethers of vinyl alcohol, preferably methyl and ethylethers, $C_1$–$C_8$-, preferably $C_1$–$C_4$-alkylesters of vinyl alcohol, preferably vinyl acetate, derivatives of maleic acid, preferably maleic anhydride, derivatives of acrylonitrile, preferably acrylonitrile and methacrylonitrile.

Preferred polymers are polystyrene, polymethylstyrene, copolymers of styrene and at least one further monomer, selected from the group comprising α-methylstyrene, butadiene, isoprene, acrylonitrile, methylacrylate, methylmethacrylate, maleic anhydride and olefins such as, for example, ethylene and propylene. Copolymers of acrylonitrile, butadiene and styrene, copolymers of acrylic ester, styrene and acrylonitrile, copolymers of styrene and α-methylstyrene and copolymers of propylene, diene and styrene, for example, are considered.

The aromatic polymers generally have weight average molecular weights $M_w$ of from 1000 to 10000000, preferably 60000 to 1000000, particularly preferably 70000 to 600000, in particular 100000 to 480000, determined by light scattering.

Both linear-chain structures and structures having branching points from co-units (for example graft copolymers) are possible for the polymers. The branching centres contain, for example, star-shaped polymers or other geometric forms of the primary, secondary, tertiary, optionally quaternary polymer structure.

The copolymers may be present as random, alternating and also block copolymers.

Block copolymers include di-blocks, tri-blocks, multi-blocks and star-shaped block copolymers.

The starting polymers are generally known (for example WO 94/21 694).

The quantity of catalyst to be used is described in WO 96/34896, for example.

The quantity of catalyst to be used depends on the process to be carried out; it may be operated as a continuous, semi-continuous or batch process.

The reaction time is substantially shorter in the continuous system; it is influenced by the dimensions of the reaction vessel. In the continuous operating method, both the trickle-bed system and the liquid phase system, both having catalysts arranged in fixed manner, are as feasible as a system having suspended and, for example, circulated catalyst. The catalysts arranged in fixed manner may be present in tablet form or as extrudates.

In the batch process the polymer concentrations, in relation to the total weight of solvent and polymer, are generally from 80 to 1, preferably 50 to 10, in particular 40 to 15 wt. %.

The reaction is generally carried out at temperatures of between 0 and 500° C., preferably between 20 and 250° C., in particular between 60 and 200° C.

The reaction is generally carried out at pressures of from 1 bar to 1000 bar, preferably 20 to 300 bar, in particular 40 to 200 bar.

The catalysts may be used both reduced and also unreduced in the relevant reaction. For an industrial process use of the unreduced catalyst is more favourable by far, omitting an additional costly catalyst reduction step as in WO 96/34896.

EXAMPLES

The absolute weight average molecular weights $\overline{M}_w$ of the starting polymer and the hydrogenated product are determined by light scattering. Membrane osmosis gives the absolute number average molecular weights $\overline{M}_n$. In Examples 2 and 3 the relative GPC (gel permeation chromatography) measured values against polystyrene standards correspond, within the limits of accuracy of measurement, to the determined absolute molecular weights of the polystyrene used.

Examples 1–3

The catalysts used in the Examples are characterised in Table 1.

A 1-litre autoclave is purged with inert gas. The polymer solution and optionally the unreduced catalyst are added (Table 2). After sealing, the autoclave is blown repeatedly with protective gas and then with hydrogen. After the pressure has been released the respective hydrogen pressure is adjusted, and the batch is heated to the appropriate reaction temperature, with stirring. The reaction pressure is held constant after commencement of hydrogen absorption.

The reaction time is defined by the time from heating of the batch to the time when hydrogen absorption approaches saturation level.

On termination of the reaction, the polymer solution is filtered. The product is precipitated in methanol and dried.

The isolated product shows the physical properties indicated in the Table.

with no significant decrease in molecular weight, and with complete hydrogenation.

TABLE 1

Physical characterisation of the catalysts used

| Catalyst No. | Nitrogen pore volume for pore diameters <600 Å mm³/g | Total mercury pore volume for pore diameters 36.8 Å to 13 μm mm³/g | Mercury pore volume for pore diameters 100 Å 1000 Å mm³/g | N₂ pore volume for pore diameters <600 Å/ total mecury pore volume % | Pore volume for pore diameters 100 Å to 1000 Å/ total mecury pore volume % | Average pore diameter[1] Å | Specific total surface area (BET)[2] m²/g | Metal content % |
|---|---|---|---|---|---|---|---|---|
| 1 | 780 | 2090 | 670 | 37 | 32 | 547[3] | 61 | 0.9 |
| 2 | 770 | 2060 | 640 | 37 | 31 | 560[3] | 62 | 0.9 |
| 3 | 590 | 1658 | 460 | 36 | 28 | 507 | 144 | 60.5 |

Catalyst No. 1: Engelhard De Meern, Netherlands, C 586-301, platinum on silicon dioxide
Catalyst No. 2: Engelhard De Meern, Netherlands, C 586-300, palladium on silicon dioxide
Catalyst No. 3: Engelhard De Meern, Netherlands, C 368-12, nickel on aluminium oxide
[1]average pore diameter, measured by mercury porosimetry (DIN 66133)
[2]specific nitrogen total surface area in accordance with Brunauer, Emmett and Teller (BET, DIN 66131, DIN 66132)
[3]when calculating the average pore diameter the intermediate particle volume due to the particles for pore diameters >1 μm was disregarded.

TABLE 2

Hydrogenation of polystyrene, shown as a function of the catalyst, solvent system and reaction temperature

| Example No. | Catalyst[3] | Mass of polymer g | Solvent ml | Mass of catalyst g | Reaction temperature °C. | H₂ pressure bar | Reaction time min. | Hydrogenation[1] level % | Tg (DSC) °C. | $\overline{M}_n$ 10³ g/mol | $\overline{M}_w$ 10³ g/mol |
|---|---|---|---|---|---|---|---|---|---|---|---|
| 1 Comparative Example US-A-5612422 | Pt/SiO₂ | 200 $\overline{M}_w$ ~ 200000 g/mol | 2300 CYH | 13.5 | 150 | 875 (psig) | 110 | 98.4 | 146.6 | — | — |
| 2 according to the invention | Pt/SiO₂ | 100.2[2] | 300 CYH | 12.5 | 200 | 100 | 37 | 100 | 149 | 79.1 | 182.8 |
| 3 according to the invention | Pd/SiO₂ | 100.2[2] | 300 CYH | 12.5 | 200 | 100 | 125 | 100 | 147 | 78.4 | 184.7 |
| 4 according to the invention | Ni/Al₂O₃ | 100.2[2] | 300 CYH | 12.5 | 170 | 100 | 200 | 100 | 148 | 71.1 | 169.2 |

[1]Determined by ¹H—NMR spectroscopy
[2]Polystyrene type 158 k, $\overline{M}_w$ = 280000 g/mol, BASF AG, Ludwigshafen, Germany
[3]Engelhard De Meern, Netherlands, nickel on aluminium oxide, C 368-12, reduced and stabilised
Engelhard De Meern, Netherlands, platinum on silicon dioxide, C 586-301
Engelhard De Meern, Netherlands, palladium on silicon dioxide, C 586-300
CYH = cyclohexane The platinum catalyst (Table 2) which is characterised in that 98% of the pore volume is defined by pores of a diameter greater than 600 Å hydrogenates polystyrene incompletely at 150° C. after 110 min (98.4% Comparative Example 1).

The catalysts described in U.S. Pat. No. 5,612,422 result in an approximately 20% decrease in molecular weight $\overline{M}_w$.

The specific pore size distribution of the catalyst of the present invention shows in the case of the platinum catalyst, reaction times which are significantly shorter than those for Comparative Example 1, at a higher molecular weight of the polystyrene used and a higher polymer concentration (Example 2).

The measured molecular weights of the completely hydrogenated products correspond, within the limits of accuracy of measurement, to those of the polystyrenes used (Examples 2, 3), even at high reaction temperatures.

The hydrogenation according to the invention in the presence of the nickel catalyst can likewise be carried out at sufficient reaction speed (Example 4) at higher temperatures

What is claimed is:

1. A process for hydrogenating an aromatic polymer comprising combining said polymer with hydrogen in the presence of at least one catalyst wherein a metal or mixture of metals from Group VIII of the Periodic Table together with a support of silicon dioxide, aluminum dioxide or a mixture thereof is used as the catalyst, and where the catalyst pore volume as defined by pores of diameters between 100 and 600 Å, measured by mercury porosimetry, is from 100 to 15%, in relation to the total pore volume, measured by mercury porosimetry, the hydrogenation level being at least 80%.

2. Process according to claim 1, wherein the pore volume is from 90 to 20%, in relation to the total pore volume.

3. Process according to claim 1, wherein the pore volume is from 80 to 25%, in relation to the total pore volume.

4. Process according to claim 1, wherein the pore volume is from 70 to 25%, in relation to the total pore volume.

5. Process according to claim 1, wherein the metals are selected from among nickel, platinum, ruthenium, rhodium and palladium.

6. Process according to claim 1, wherein the metals are selected from among nickel, palladium and platinum.

7. Process according to claim 1, wherein the process is carried out in the presence of solvents which are usable in hydrogenation reactions.

8. Process according to claim 7, wherein the solvents have a water content of from 0.1 to 500 ppm.

9. Process according to claim 8, wherein the water content is from 0.5 to 200 ppm.

10. Process according to claim 9, wherein the water content is from 1 to 150 ppm.

* * * * *